United States Patent [19]

Sherman

[11] Patent Number: 4,620,059

[45] Date of Patent: Oct. 28, 1986

[54] CABLE VIBRATION DAMPENER AND METHOD OF INSTALLING

[75] Inventor: Thomas E. Sherman, Chagrin Falls, Ohio

[73] Assignee: Preformed Line Products Company, Cleveland, Ohio

[21] Appl. No.: 804,267

[22] Filed: Dec. 3, 1985

[51] Int. Cl.⁴ .............................................. H02G 7/14
[52] U.S. Cl. ........................................ 174/42; 29/456; 174/DIG. 12
[58] Field of Search ................. 174/42, 173, DIG. 12; 24/115 N, 129 C, 131 C; 29/456; 57/906

[56] References Cited

U.S. PATENT DOCUMENTS

| | | | |
|---|---|---|---|
| 2,172,810 | 9/1939 | Sherman | 174/42 X |
| 3,463,870 | 8/1969 | Eucker | 174/42 |
| 3,659,038 | 4/1972 | Shealy | 174/42 |
| 3,884,173 | 5/1975 | Fabula | 174/42 X |
| 4,059,129 | 11/1977 | Feis | 174/42 X |

FOREIGN PATENT DOCUMENTS

| | | | |
|---|---|---|---|
| 54-7585 | 1/1979 | Japan | 174/42 |
| 656142 | 4/1979 | U.S.S.R. | 174/42 |
| 723711 | 3/1980 | U.S.S.R. | 174/42 |
| 881922 | 11/1981 | U.S.S.R. | 174/42 |

Primary Examiner—Laramie E. Askin
Attorney, Agent, or Firm—Fay, Sharpe, Fagan, Minnich & McKee

[57] ABSTRACT

A device for suppressing wind induced motions in aerial cables and a method of installing the same. The device comprises a cylindrical rod of substantial length having a generally straight center section terminating in helically configured cable gripping sections. Adjacent one end is a non-gripping support helix. The support helix functions to provide support to one end of the device while the device is slid to a position on the cable where the helically configured gripping section at the opposite end can be wrapped to the aerial cable.

12 Claims, 6 Drawing Figures

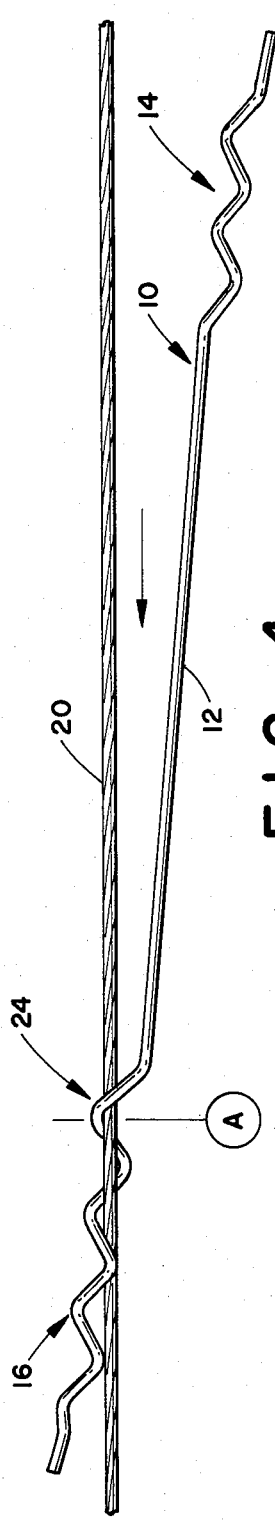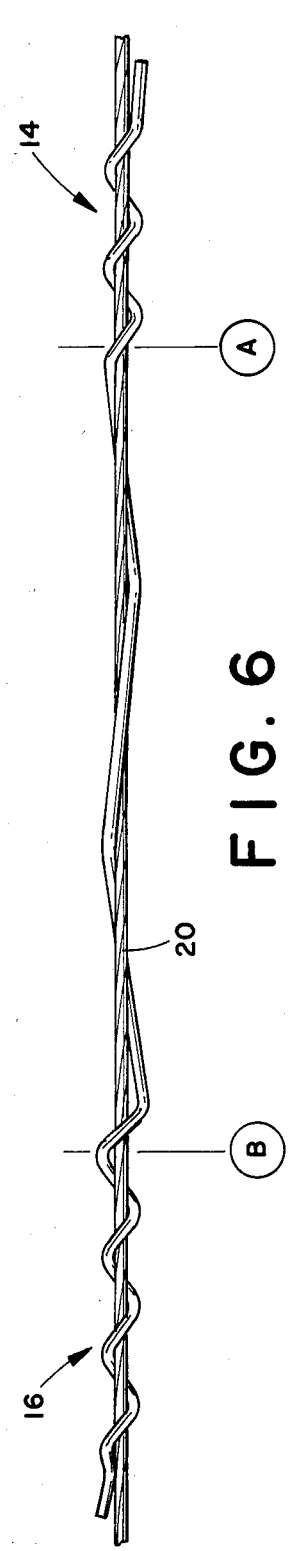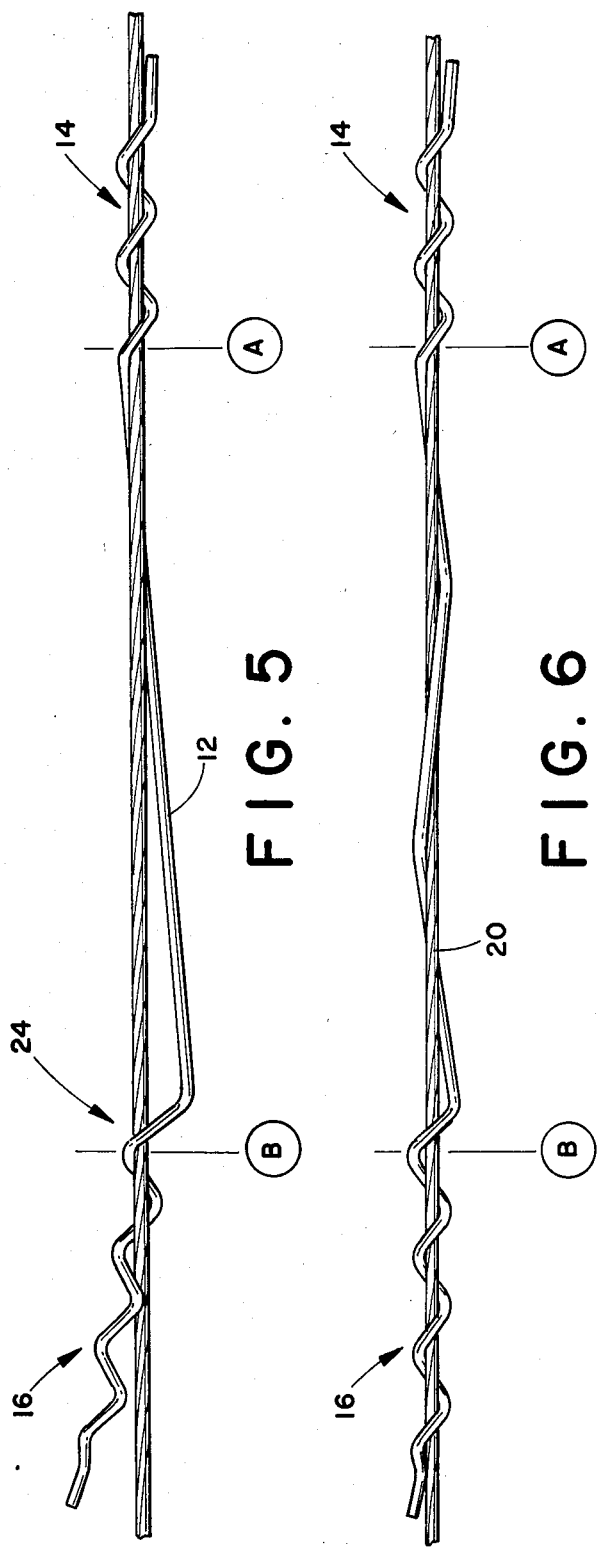

CABLE VIBRATION DAMPENER AND METHOD OF INSTALLING

BACKGROUND OF THE INVENTION

The subject invention is directed to a vibration dampener and a method of installing the same.

The invention is especially suited for use on electric power lines and will be described with particular reference thereto; however, as will become apparent, the invention is capable of broader application and could be used on a variety of aerial cables, guy wires and the like.

Under certain wind conditions, and especially when accompanied by icing, aerial electric power lines or cables are sometimes subjected to a phenomenon commonly called "galloping". Galloping is a low-frequency, high amplitude motion of the lines. When it becomes severe, it can cause damage to the electrical conductors, the supporting structures and support hardware.

A somewhat parallel phenomenon is known as aeolian vibration. This is a higher frequency, lower amplitude vibration than that generally associated with galloping. As a smooth stream of air passes over a cylindrical shape, such as a power line, alternating vortices are formed which create alternating pressures that tend to move the power line at right angles to the direction of air flow. It is this mechanism which causes aeolian vibration.

Aeolian vibration can, over a period of time, damage the system in somewhat the same manner as galloping. Consequently, there has been a constant and ongoing interest in developing methods and apparatus for suppressing both galloping and aeolian vibrations.

A device has recently been developed which suppresses galloping and significantly reduces aeolian vibrations. The device comprises a non-metallic rod having a length in a range of approximately 10 to 18 feet. Each end of the rod has a multiple turn, helically configured gripping section designed to tightly fit and grip a relatively narrow range of wire or cable diameters. The midsection of the rod between the helical end portions is generally straight.

In installing the device, the installer first wraps one helical end section into gripping relationship with the electrical cable. He then moves to the opposite end of the device and wraps the entire straight midsection of the rod at least twice around the cable to produce a long, slow helix wrap. Thereafter, the second helically configured end section is wound tightly into gripping relationship with the cable.

The long, slow helix wrapped midsection of the device acts to vary the aerodynamic profile of the cable and increases the aerodynamic stability of the cable. When the total cable span has the devices applied thereto, cable galloping and aeolian vibration are eliminated or significantly reduced.

Devices of the type discussed have proven highly desirable for the purposes described. However, one of the problems with the devices has been certain installation difficulties. Specifically, because of their significant length and relative flexibility, they are somewhat difficult to hold in position as the first gripping helix is wound in place on the cable. In addition, after the first end is installed, the entire rod dangles and swings as the installer moves to the second end to complete the wrapping and the attachment of the helically configured gripping section at that end. Since the installations are often made at substantial elevations using trolleys and personnel lift equipment, the dangling, swinging rod can present special problems and slows down the installation process.

BRIEF STATEMENT OF THE INVENTION

The subject invention provides an improvement to the general vibration dampener structure described above which overcomes the noted installation problems and allows the dampeners to be installed by an inventive method.

Specifically, in accordance with one aspect of the subject invention, the vibration dampener device comprises an elongated flexible rod having a generally straight midsection of substantial length terminating in relatively short end sections. Each end section includes a cable gripping portion in the form of a multiple helix sized to tightly encircle and grip the cable on which the dampener is to be installed. Formed adjacent at least one end section is a support helix sized to freely encircle the cable without substantial gripping. Preferably, the support helix is sized such that when it is in position about the cable, the cable can slide relatively freely therethrough.

In accordance with another aspect of the invention, there is provided a method of installing the improved dampener. The method generally includes grasping the dampener adjacent the support helix and wrapping the support helix about the cable at a first location. Thereafter, the dampener is slid along the cable to bring the end furthest from the support helix to generally the first location. The cable gripping portion adjacent that end is then wrapped about the cable. Thereafter, the installer moves to a second location adjacent the support helix and wraps the midsection of the vibration dampener at least twice about the cable and then wraps the cable gripping section adjacent the support helix into cable gripping relationship about the cable.

Through the provision of the support helix, the installation of the dampener can be accomplished by a single person without having the dampener dangling or swinging from the cable. The use of the support helix maintains the dampener completely under control at substantially all times during the installation process. In addition, support and control is provided without the necessity of resorting to a separate support structure or requiring additional installation personnel.

Accordingly, a primary object of the invention is the provision of a vibration dampener device which is simpler to install than prior devices.

A further object is the provision of a dampener device of the general type described which includes an integrally formed portion that can be used for supporting a free end of the device during installation.

Another object is the provision of a method of installing a vibration dampener of the type described by a series of steps which allow the dampener to be maintained under the control of a single installer at all times.

BRIEF DESCRIPTION OF THE DRAWINGS

The above and other objects and advantages will become apparent from the following description when read in conjunction with the accompanying drawings wherein.

DETAILED DESCRIPTION OF THE PREFERRED EMBODIMENT

Figure 1:
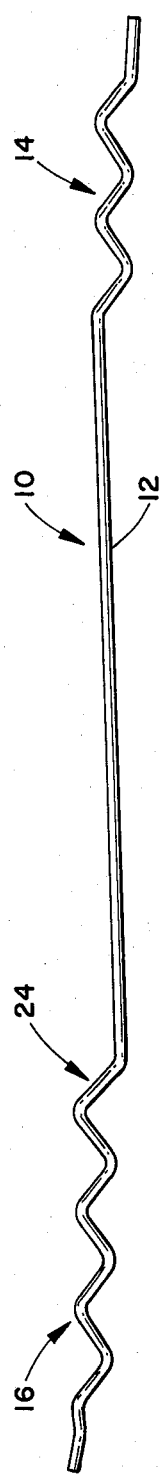
FIG. 1 is a side view of a vibration dampener formed in accordance with the preferred embodiment.

Referring more particularly to the drawings wherein the showings are for the purpose of illustrating a preferred embodiment of the invention only, and not for the purpose of limiting same, FIG. 1 shows the overall arrangement of a vibration dampener or air flow spoiler comprising an elongated rod member 10 having a generally straight intermediate section 12 terminating in gripping end portions 14 and 16. The elongated rod member 10 could be formed from any of a variety of different materials having suitable characteristics. In the subject embodiment, however, it is preferably formed from a non-metallic material such as polyvinyl chloride (PVC) plastic.

In the embodiment under consideration, the rod member 10 has a diameter of approximately one-half inch and an overall length of approximately fourteen feet. These dimensions could, of course, vary somewhat. The central section 12 has a length of approximately twelve feet.

Both of the gripping sections 14 and 16 have a helical configuration sized to tightly encircle and grip the cable on which the dampener is to be installed. The use of such helical gripping sections is well known in the art. A variety of prior art patents describe the use of such helixes and their design so as to properly grip and tightly hold on the cable or wire to which such appliances are to be installed. For example, U.S. Pat. Nos. 2,744,707, 3,286,023, and 3,664,010 describe and illustrate the design and application of such helical gripping portions.

Figure 2:
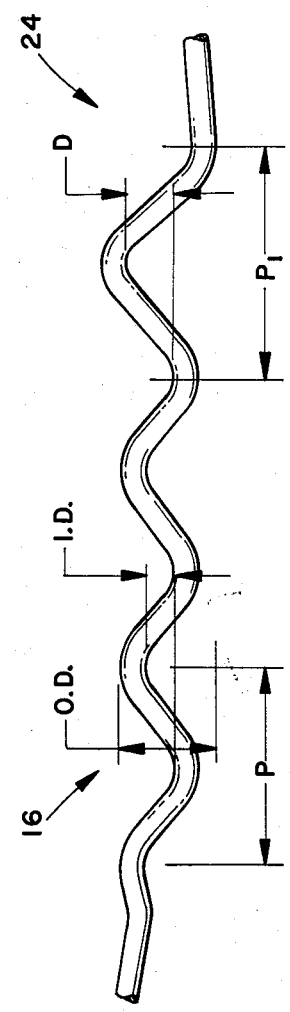
FIG. 2 is an enlarged view of the left-hand end of FIG. 1.

FIG. 2 illustrates the left-hand gripping section 16. As shown therein, the internal open diameter I.D. is sized so as to be slightly less than the outer diameter of the cable or conductor on which the unit is to be installed. The outer diameter O.D. of the helical gripping portion does, as is apparent, depend on the I.D. and the diameter of the rod from which the dampener is formed. The pitch of the helix of this gripping portion 16 is denoted by P.

Dampeners having the general characteristics thus far described are known in the art. They have been applied by first wrapping one gripping end portion to the cable and then moving to their other end and wrapping the midsection at least twice around the cable to produce a long, slow helix configuration tightly engaged with the cable. Subsequent to wrapping the midsection, the final gripping section is applied.

Figure 3:
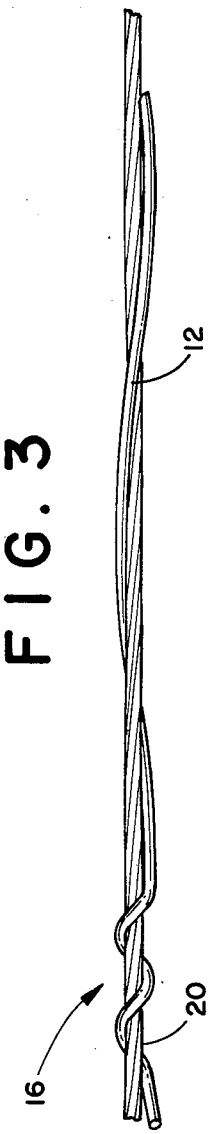
FIG. 3 is a view of approximately the left-hand half of a vibration dampener installed on an overhead cable; and, FIGS. 4–6 show the sequence of steps used in installing the vibration dampener of FIG. 1.

FIG. 3 shows approximately the left-hand half of a dampener of the general type described attached to a conductor or a cable 20. With the dampener in position, the combined dampener and cable present a constantly changing aerodynamic cross-section as is apparent from FIG. 3. The constantly varying cross-section tends to create air vortices at a variety of different points around the composite cable and dampener configuration. The varying locations of these vortices tend to suppress wind induced motions of the cable. Even under icing conditions and resulting aerodynamic cross-section varies continuously in a manner which suppresses wind induced motions. Even when icing takes place, nonuniform aerodynamic cross-sections remain.

As discussed earlier, one of the problems connected with installing these vibration dampeners has been the necessity of installing one end portion in gripping relationship with the cable and then moving the substantial distance to the other end for applying it to the cable. Normally, either two installers must work jointly or the spoiler dangles and swings from the cable while the single installer moves to the other end.

In accordance with the subject invention a modification to the basic vibration dampener configuration is provided such that installation is greatly facilitated and can be performed by a single installer. Specifically, according to the subject invention, at least one of the gripping end portions 14 or 16 includes an associated non-gripping support helix which can be used to support one end of the dampener while permitting free sliding of the dampener along the cable. In the embodiment under consideration, the left-hand end portion of the dampener is provided with a support helix portion 24 which is located adjacent the end of the dampener, preferably between the gripping end portion 16 and the midsection 12. Support helix 24 has an internal diameter D (see FIG. 2) which is at least nearly as large and preferably slightly larger than the outer diameter of the cable on which the dampener is to be installed. In any event, it should be larger than the helixes of the gripping portion and sized so that when it is applied to the cable, it does not grip tightly and the cable can slide freely therethrough. The support helix portion preferably makes at least one full loop or, in other words, one full pitch $P_1$; however, it could have more loops if desired so long as tight gripping of the cable does not result.

In addition, the support helix and the helically formed gripping sections preferably have a common spiral, ie. left-hand or right-hand.

FIGS. 4–6 illustrate the preferred sequence of steps used in applying or installing a vibration dampener incorporating the support helix feature. First, the installer grasps the vibration dampener adjacent the support helix 24 and applies the support helix to the cable 20 by wrapping it once about the cable, as shown in FIG. 4. The end portion of the dampener is thus supported by the cable but can slide freely therealong since, as discussed, the support helix is sized so as not to tightly grip or grasp cable 20. Thereafter the installer, while remaining at position A, slides the dampener to the left to bring the gripping end portion 14 into location generally at position A. The gripping end portion 14 is then wrapped about the cable to firmly grip the cable and lock the vibration dampener into position thereon. The opposite end of the dampener is, of course, supported during this operation by the support helix 24. The installer then moves from position A to position B adjacent the gripping end portion 16. At position B he releases the support helix 24 and pulls on the dampener to eliminate drooping in the midsection and then wraps the straight midsection 12 twice about the cable 20 as shown in FIG. 6. While remaining at position B, the installer subsequently wraps gripping section 16 into the final gripping and engaging position to complete the installation.

If the dampener is pulled longitudinally immediately prior to and during the installation of gripping section 16, the support helix is stressed and tensioned in the nature of a spring. The support helix can thus function to keep the midsection of the dampener tightly engaged with the cable even during ambient temperature changes which might otherwise produce sagging due to differences in the coefficients of thermal expansion of the cable and the dampener.

As is apparent from the foregoing, the dampener is basically under complete control throughout the installation process. Furthermore, the installation can be performed by a single person without the unattached end portion swinging free at any time.

The invention has been described with reference to the preferred embodiment. Obviously, modifications and alterations will occur to those skilled in the art. It is intended to include all such modifications and alterations insofar as they come within the scope of the following claims or the equivalents thereof.

Having thus described the invention, it is now claimed:

1. A device for dampening wind induced vibrations in aerial cables comprising: an elongated rod having a generally straight midsection terminating in helically configured cable gripping sections sized so as to tightly grip the aerial cable on which the device is to be used, and a support helix associated with at least one of said gripping sections, said support helix comprising at least one complete spiral with an open inner diameter greater than the inner diameter of the helically configured gripping sections and at least approximately as great as the diameter of the cable on which the device is to be used.

2. The device of claim 1 wherein said support helix is located between said midsection and the associated gripping section.

3. The device of claim 1 wherein said elongated rod is formed of a non-metallic material.

4. The device of claim 1 wherein said rod has a length greater than approximately ten feet.

5. The device of claim 1 wherein said support helix is a continuation of the associated gripping helix.

6. The device of claim 1 wherein each of said helical gripping sections is spiraled in the same direction.

7. The device of claim 6 wherein said support helix is spiraled in the same direction as said helical gripping sections.

8. A method of installing on aerial cables a vibration dampener of the type comprising an elongated rod with a generally straight midsection terminating at first and second ends in cable gripping helical sections and having at least one non-gripping support helix adjacent the first end, said method comprising the steps of:
   (a) at a first location adjacent the cable, wrapping said support helix about the cable;
   (b) while remaining generally at said first location, sliding said rod along said cable to bring said second end generally to the first location;
   (c) wrapping the cable gripping helical portion at the second end into gripping relationship with said cable;
   (d) wrapping the straight midsection of the rod around said cable and; thereafter,
   (e) applying the cable gripping helical portion at the first end to said cable.

9. The method as defined in claim 8 wherein said straight midsection is wrapped at least twice around said cable.

10. The method as defined in claim 9 wherein said support helix is unwrapped from said cable prior to wrapping said straight midsection.

11. The method as defined in claim 8 including the step of moving to the first end of said rod prior to wrapping the straight midsection about said cable and applying the cable gripping helical portion to said cable.

12. The method as defined in claim 8 including the step of applying a substantial longitudinal force to the dampener to longitudinally tension said support helix prior to applying the cable gripping helical portion at the first end.

* * * * *